United States Patent [19]

Esmond

[11] 4,419,237

[45] Dec. 6, 1983

[54] PLEATED KIDNEY

[76] Inventor: William G. Esmond, 800 Country Club Rd., Havre de Grace, Md. 21078

[21] Appl. No.: 823,029

[22] Filed: Aug. 9, 1977

[51] Int. Cl.³ ............................................. B01D 31/00
[52] U.S. Cl. .................................. 210/321.2; 210/541
[58] Field of Search ............... 210/321.1, 321.2, 321.3, 210/541; 55/158

[56] References Cited

U.S. PATENT DOCUMENTS

| | | | |
|---|---|---|---|
| 3,695,445 | 10/1972 | Esmond | 210/321 B |
| 3,738,495 | 6/1973 | Esmond | 210/321 B |
| 3,912,637 | 10/1975 | Esmond | 210/321 B |
| 4,051,041 | 9/1977 | Riede | 210/321 B |

*Primary Examiner*—John Adee
*Attorney, Agent, or Firm*—Charles E. Brown

[57] ABSTRACT

This disclosure relates to a dialyzer primarily intended to be utilized as an artificial kidney and includes a plurality of blood and bath plates stacked in alternating relation with there being a membrane between adjacent plates. The membrane is preferably in the form of a continuous web arranged in pleated relation with respect to the plates. The stacked plates are arranged in a housing formed of side plates interlocked together and having flow controlling means for effecting flow into and out of flow passages defined by the plates and membranes on opposite sides of each membrane.

11 Claims, No Drawings

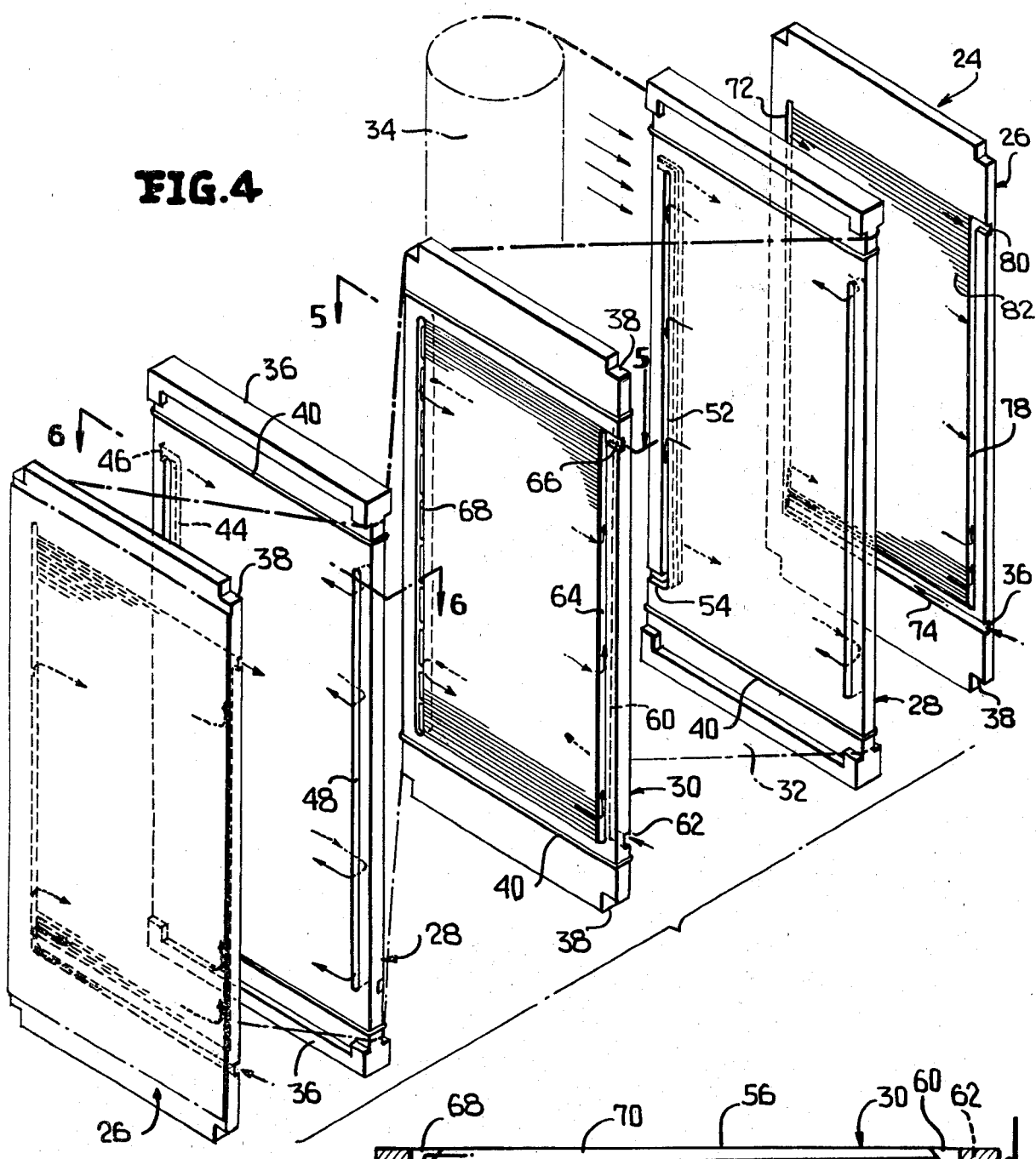

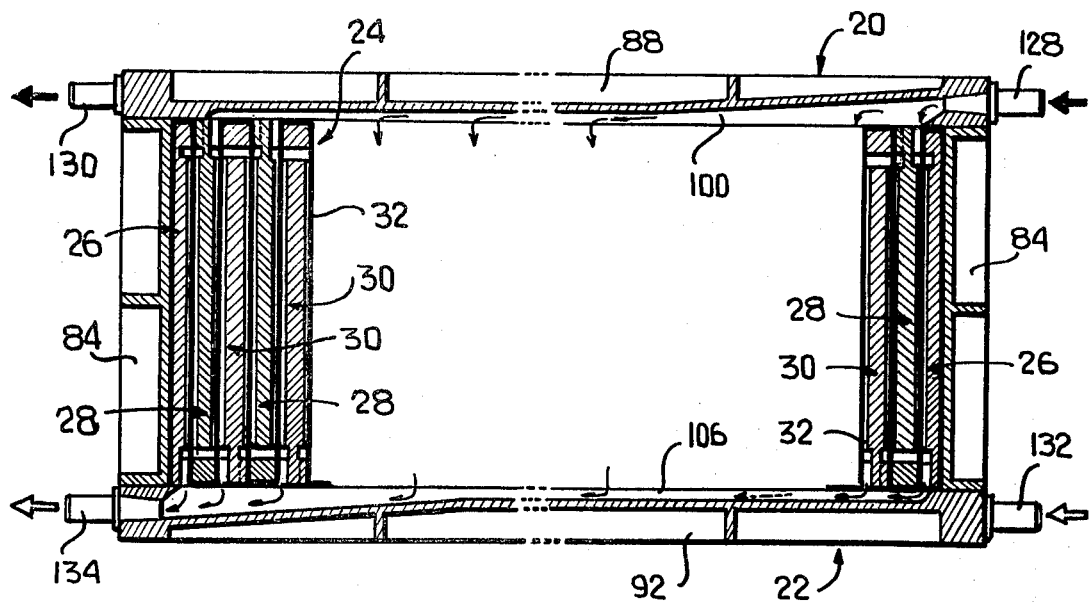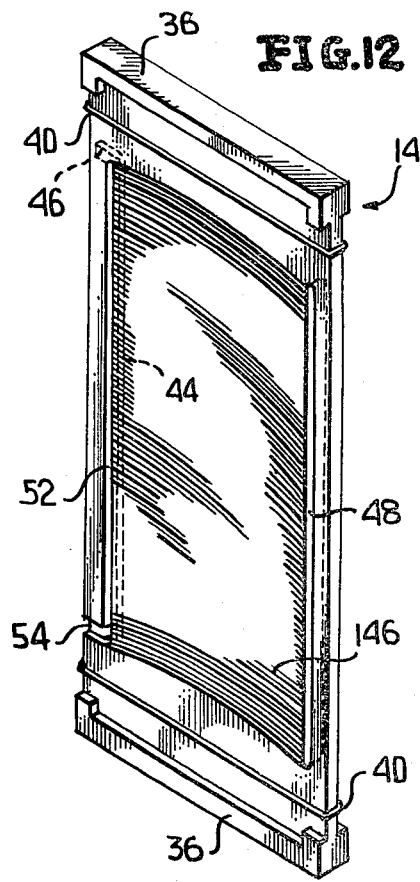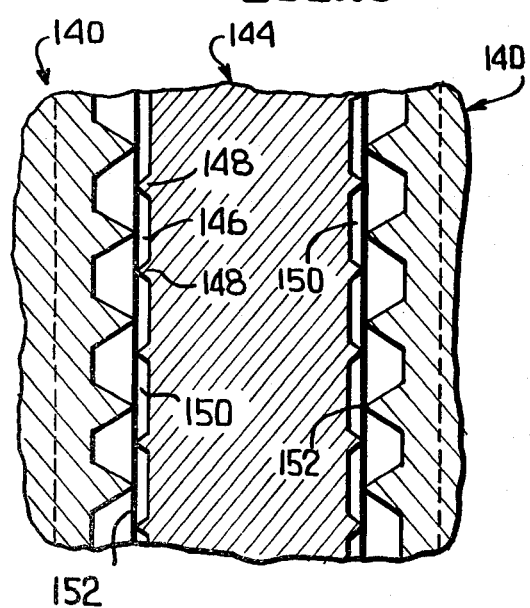

PLEATED KIDNEY

This invention relates in general to new and useful improvements in exchange devices, and more particularly to a novel dialyzer.

In accordance with this invention, there is provided a dialyzer which has a relatively low blood time so as to reduce the shock which is effected by the temporary removal of blood from the body.

Another feature of the dialyzer is that the construction thereof allows the use of new stiffer membranes as well as the use of conventional membranes formed of plastics material such as Cuprophane.

Another feature of the dialyzer is that it permits the production of kidneys without having to perforate the membrane thereby eliminating paring of the membrane and also eliminating the possibility that there may exist defects which are hidden.

The dialyzer according to this invention may utilize the natural molecular orientation of the Cuprophane membrane in a manner to permit the deformation of the membrane to define blood passages on that side of a membrane which opposes a flat blood plate while at the same time assuring the formation of continuous blood passages.

Yet another feature of the dialyzer is that the plate construction thereof allows the flow path length to be doubled by permitting flow first on one side of a plate and then back along the opposite side of the same plate.

Another feature of the dialyzer is that it solves the end seal problem which has existed in the past without the use of cements and with lower pressure sealing requirements.

A still further advantage of the dialyzer is that it permits automatic assembly by permitting the membrane to be delivered directly from a roll as a continuous pleated membrane with no cutting or perforating and that the plates are so constructed that alignment of the plates is automatically effected so as to allow precision assembly.

With the above, and other objects in view that will hereinafter appear, the nature of the invention will be more clearly understood by reference to the following detailed description, the appended claims and the several views illustrated in the accompanying drawings.

IN THE DRAWINGS

FIG. 4 is an exploded perspective view showing the manner in which the membrane in a continuous roll form is pleated and assembled with respect to bath and blood plates.

FIG. 5 is an enlarged fragmentary sectional view taken along the line 5—5 of FIG. 4 and shows the specific cross-section of one of the bath plates.

FIG. 6 is an enlarged fragmentary transverse sectional view taken along the line 6—6 of FIG. 4 and shows the cross-section of one of the blood plates.

FIG. 10 is a horizontal sectional view taken along the line 10—10 of FIG. 1 and shows further the arrangement of the stack within the housing and the flow of fluids through the housing and stack.

FIG. 12 is a perspective view showing a modified form of blood plate.

FIG. 13 is an enlarged fragmentary sectional view similar to FIG. 9 illustrating the details of the blood plate of FIG. 2 in conjunction with bath plates such as the bath plate of FIG. 9.

Figure 1:
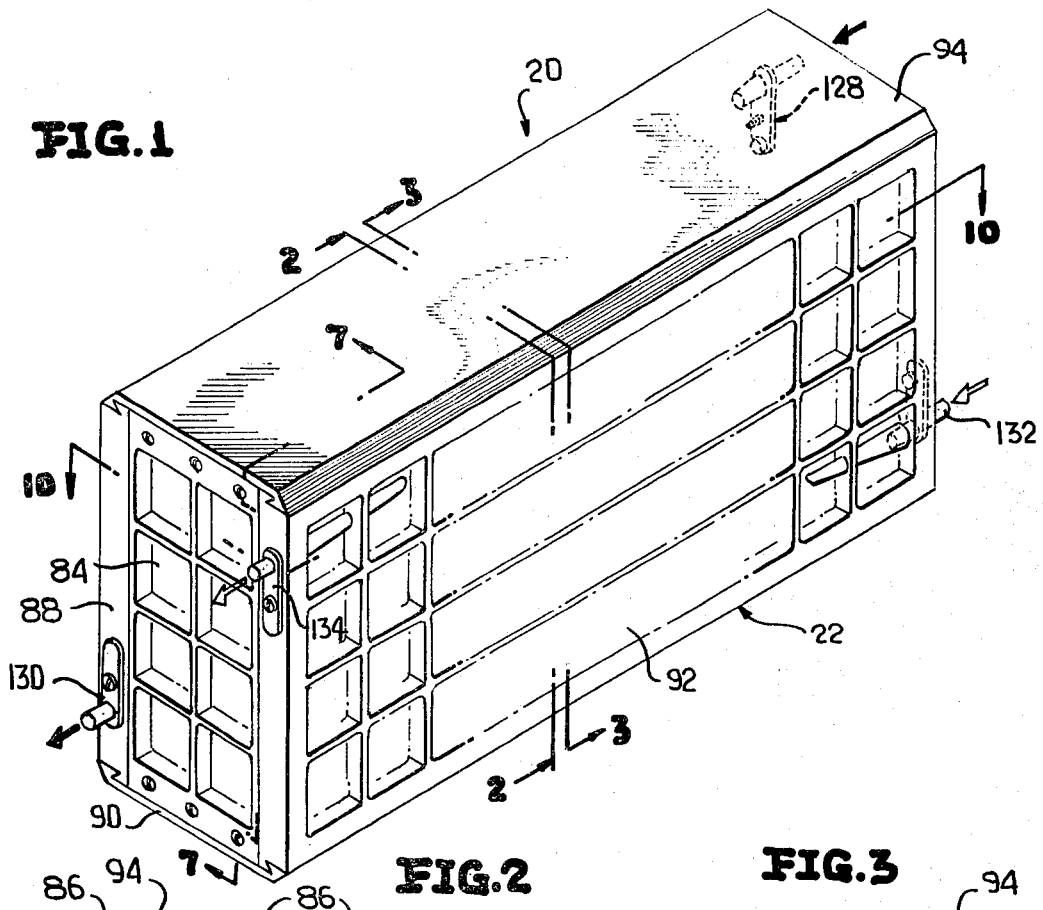
FIG. 1 is a perspective view of the dialyzer.

Referring now to the drawings in detail, it will be seen that there is illustrated in FIG. 1 a dialyzer or kidney formed in accordance with this invention, the dialyzer being generally identified by the numeral 20. The dialyzer 20 includes a multi-part housing, generally identified by the numeral 22, in which there is sealed an exchange stack, generally identified by the numeral 24 and generally illustrated in FIG. 10. For purposes of description, the exchange stack 24 is illustrated in its simplest form in FIG. 4. The exchange stack illustrated in FIG. 4 includes a pair of identical terminal plates 26, blood plates 28 and a bath plate 30. Between adjacent ones of the plates 26, 28 and 30 are membranes 32 which in one embodiment of the invention are integrally connected and form a pleated arrangement, as is clearly shown in FIG. 10. The pleated membrane is supplied from a roll 34 and is in the form of a plastics material film which is compatible with human blood and which will provide the desired exchange characteristics between a bath liquid on one side thereof and blood on the other. One of such known plastics material is Cuprophane which is substantially unstretchable in its length direction and is stretchable in a transverse direction in an advantageous manner which will be described hereinafter.

It is to be noted that each of the blood plates 28 is provided at the opposite end thereof with a generally C-shaped projection 36 which projects the opposite sides thereof. It is to be also noted that each of the plates 26 and 30 is provided with notches 38 at the four corners thereof and is of a length to be received within the projections 36 in interlocking relation. In this manner, the plates 26, 28 and 30 are automatically aligned with one another when assembled.

Figure 7:
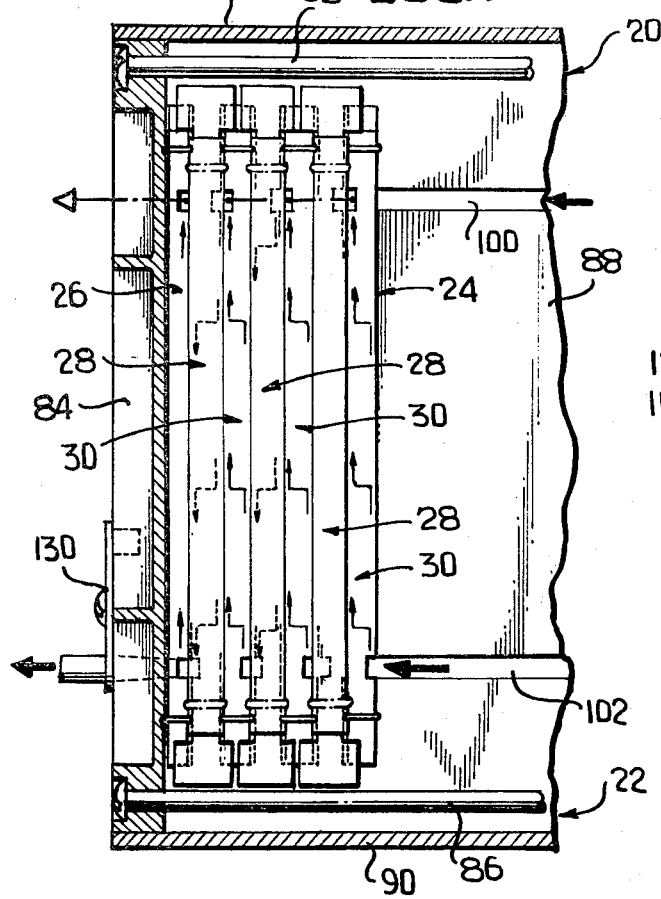
FIG. 7 is an enlarged fragmentary vertical sectional view taken generally along the line 7—7 of FIG. 1 and shows specifically the arrangement of the plates in a stack and the general flow of blood and bath with respect thereto.

In order to effect sealing of the membranes 32 to the respective ones of the plates 26, 28 and 30, the plates are molded of a soft plastics material such as polyethylene and the like which is compatible with blood. Further, each of the plates 28 and 30 is provided with a transversely extending, peripheral rib 40 adjacent the opposite ends thereof. It is to be understood that the ribs of the plates 28 and 30 are longitudinally offset in the manner best illustrated in FIG. 7 so as not to interfere with one another. It is to be understood that when the plates and membranes are tightly clamped together, the ribs 40 will be slightly flattened and will slightly extend into the adjacent plates so as to form a tight seal with the respective membranes at the ends of the plates. The plates 26 may also be provided with ribs 40, at least on the face thereof opposing the plates 28.

In order that the function of the stack 24 may be readily understood, the details of the plates 26, 28 and 30 will be set forth here.

The plates 28 are the blood plates and in the form of the invention illustrated in FIG. 4, have opposite surfaces which, with the exception of the projections 36, are planar. A surface 42 is provided with a supply groove 44 adjacent one edge thereof, the supply groove 44 extending a major portion of the length of the plate 28, as is best shown in FIG. 4. At one end of the supply groove 44 is a notch 46 which functions as a supply passage for directing blood into the supply groove 44. The notch 46 opens out through the adjacent edge of the plate 28.

Blood flow with respect to the plate 28 will be from the supply groove 44 along the surface 42 towards the opposite end of the plate and into a transverse slot 48 which directs the blood to the opposite surface 50 of the plate 28. Blood flows then along the surface 50 and into a return groove 52 which is generally aligned with the groove 44, but formed in the surface 50. A notch 54 is formed at the end of the return groove 52 remote from the notch 46 with the notch 54 being a return passage and opening out through the same edge of the plate 28 as the notch 46.

It will be readily apparent from the foregoing that blood supply and blood return with respect to each blood plate 28 is effected through the notches formed in one edge thereof. It will also be seen from FIG. 4 that the pleated membrane is open along that edge of each blood plate 28 in which the notches 46 and 54 are formed so as to permit the proper delivery and discharge of blood.

Each of the bath plates 30 have opposite surfaces 56, 58. The surface 58 has formed therein adjacent the edge thereof remote from that edge of the plates 28 in which the notches 46 and 54 are formed, a longitudinally extending bath supply groove 60. Opening into the groove 60 from the adjacent edge of the plate 30 is a supply notch 62. A return groove 64 is formed in the surface 58 in alignment with the groove 60 and a return or discharge notch 66 extends from the groove 64 through the adjacent edge of the bath plate 30 adjacent that end thereof remote from the notch 62.

Adjacent the opposite edge of the bath plate 30 is a through slot 68 through which a bath liquid having flowed along the surface 56 passes and is directed to the surface 58. For a reason to be described hereinafter, the surfaces 56 and 58 are provided with transversely extending grooves 70 which extend between the grooves 60 and the slots 68 on the one hand and the slots 68 and the grooves 64 on the other hand.

Each terminal plate 26 is of a construction similar to one face of the bath plate 30. The surface of the opposite face is planar. The one face is provided adjacent the edge thereof with a supply groove 72 which is supplied with a bath by means of a transverse groove 74 which extends out through the opposite edge of the plate in the form of a notch 76. A return groove 78 is formed in the one surface adjacent that edge through which the notch 76 extends and is provided with a return passage in the form of a notch 80 which opens through the same edge of the plate 26 as the notch 76. Grooves 82 extend transversely of the plate 26 between the grooves 72 and 78.

It is also to be noted that the pleated membrane is so related with respect to the plates 26 and 30 wherein the edges thereof having the notches formed therein are uncovered.

As is clearly shown in FIG. 1, the housing 22 includes a pair of end plates 84. After the plates 26, 28 and 30 have been assembled with the pleated membrane 32, the stack is clamped between the end plates 84 by means of elongated bolts 86. The bolts 86 extend above and below the stack 24 as is best shown in FIGS. 2 and 3.

The housing 22 also includes four side plates which in the illustrated position of FIG. 1 include a left side plate 88, a bottom plate 90, a right side plate 92 and a top plate 94. The plates 90 and 94 are of a transverse dimension in accordance with the predetermined width of the stack 24 and have sliding tongue and groove connections with the plates 88 and 92. These connections are identified by the numeral 96. It is to be understood that the side plates of the housing 22 are interlocked by sliding engagement of the plates 90 and 94 with the plates 88 and 92 in a manner wherein there is a clamping of the plates 88 and 92 against opposite vertical sides of the stack 24.

Most particularly, in the position illustrated in FIG. 1, the side plate 88 functions as a blood manifold plate while the side plate 92 functions as a bath manifold plate. As is best shown in FIG. 3, the inner surface of the side plate 88 is provided with a blood supply passage 100 in the form of a groove which is aligned with the notches 46 while the lower portion of the inner surface of the side plate 88 is provided with a blood discharge groove 102 which is aligned with the notches 54.

Figure 2:
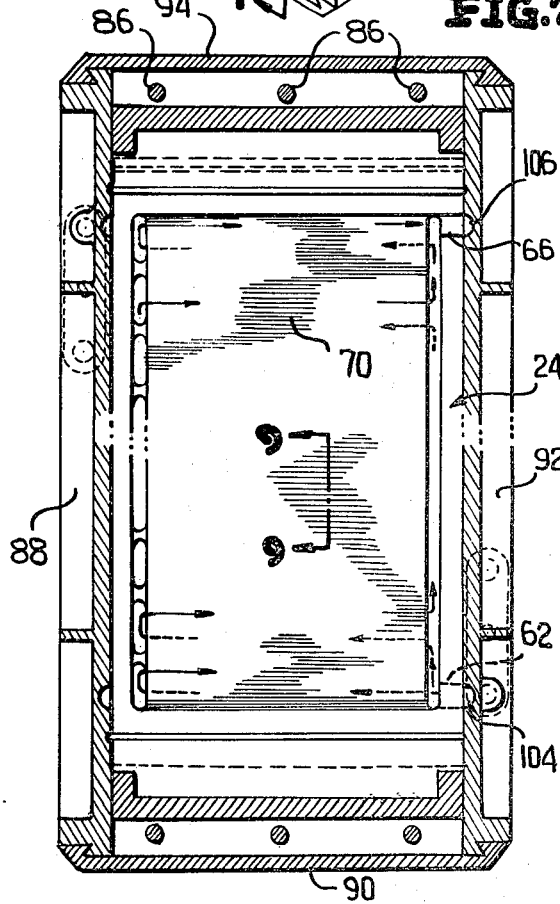
FIG. 2 is an enlarged transverse vertical sectional view taken along the line 2—2 of FIG. 1 and shows generally the details of the housing of the dialyzer and the flow with respect to a bath plate thereof.
Figure 3:
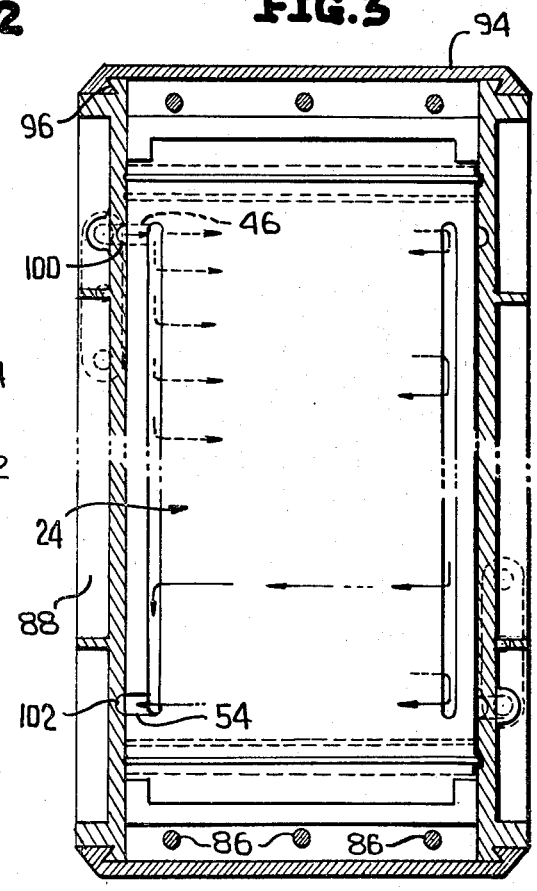
FIG. 3 is an enlarged fragmentary sectional view similar to FIG. 2 and taken along the line 3—3 of FIG. 1 and shows the details of a blood plate.

In a like manner, as is best shown in FIG. 2, the inner surface of the side plate 92 is provided with a bath supply passage in the form of a lower groove 104 which is aligned with the notches 62 while the upper part of the inner surface of the plate 92 is provided with a bath return passage in the form of a groove 106 which is aligned with the notches 66.

Figure 8:
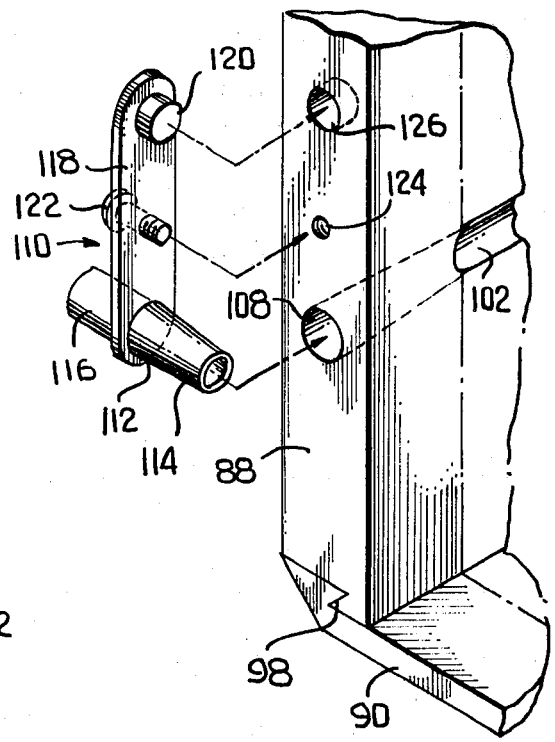
FIG. 8 is an enlarged fragmentary perspective view of one corner of the housing and shows the specific mounting of a fluid fitting.

As is clearly shown in FIGS. 8 and 10, the various ones of the grooves 100, 102, 104 and 106 at its entrance or discharge end tapers in depth and terminates in the extreme end of the respective side plate in a tapered bore 108. The housing 22 is provided with special fittings, generally identified by the numeral 110 in FIG. 8. Each fitting 110 includes a tube portion 112 which at one end is in the form of a tapered plug 114 configurated for mating engagement in the bore 108 and its opposite end is in the form of a tube 116 to which suitable tubing may be readily connected. The tube portion 112 is carried by a plate 118 which is provided at the opposite end thereof with a plug 120. The central portion of the plate 118 is provided with a threaded fastener 122.

The end of each of the side plates 88, 92 is provided adjacent the tapered bore 108 therein with a threaded bore 124 and a blind bore 126. The bore 126 receives the plug 120 while the fastener 122 is threaded into the threaded bore 124 so as to wedge the plug portion 114 into its respective tapered bore 108.

Referring once again to FIG. 1, it will be seen that the fittings may be identified as a blood supply fitting 128, a blood discharge or outlet fitting 130, a bath supply fitting 132 and a bath outlet or discharge fitting 134. While the blood and bath will flow longitudinally through the housing 22 in the same direction, it will be seen that the blood and bath will flow on opposite sides of a membrane 32 in opposite directions.

At this time it is also pointed out that the particular construction of the plates 88 and 92 permit the plates 88 and 92 to be identical, which is also true of the plates 90 and 94 and end plates 84.

It is to be understood that the pressure of the blood will be slightly higher than the pressure of the bath. Thus, with reference to FIG. 9, it will be seen that when there is blood and bath flow into the dialyzer 20, due to the fact that the membrane 32 may stretch in a transverse direction, the membrane 32 stretches into the grooves 70 on opposite sides of the bath plate so as to form in association with the grooves 70 bath passages 136. In a like manner, the ballooning of the membranes 32 into the grooves 70 results in the formation between the membranes 32 and the planar faces of the blood plates 28 blood flow passages 138. Thus, on opposite sides of the membranes 32 are a plurality of blood flow passages 138 and bath flow passages 136.

It will also be apparent that although the blood flow passages 138 are formed by the deformation of the membranes 32 under pressure, the blood flow passages 138 are accurately formed in each instance and are uninterrupted. At the same time, the blood flow passages 138 are relatively thin so as to provide for almost laminar flow.

Considering the dialyzer 20 as illustrated in FIGS. 1 through 10, it will be seen that the dialyzer is of a construction wherein it could be assembled by automatic machinery without difficulty in that the various plates are automatically aligned by the configurations thereof. Further, there is no problem of sealing the membranes with respect to the individual plates in that this is automatically accomplished. Inasmuch as the membrane need not be perforated or cut in any manner after being assembled with the plates, it will be readily apparent that bath and blood flow through the stack 24 is assured. Further, sealing of the various flow passages is also automatic and assures that the use of sealants of the adhesive type is not required. Thus, with the exception of the membranes, all of the components of the dialyzer 20 are reuseable.

Figure 9:
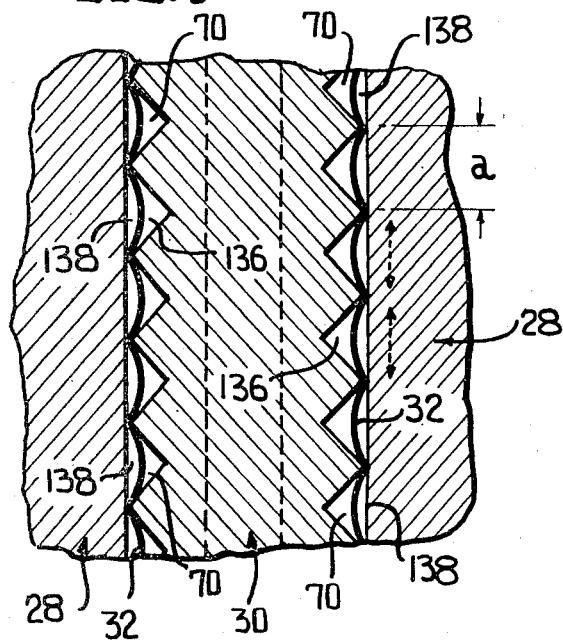
FIG. 9 is an enlarged fragmentary sectional view taken generally along the line 9—9 of FIG. 2 and shows the specific arrangement of adjacent plates and the membranes therebetween when the dialyzer is functioning.
Figure 11:
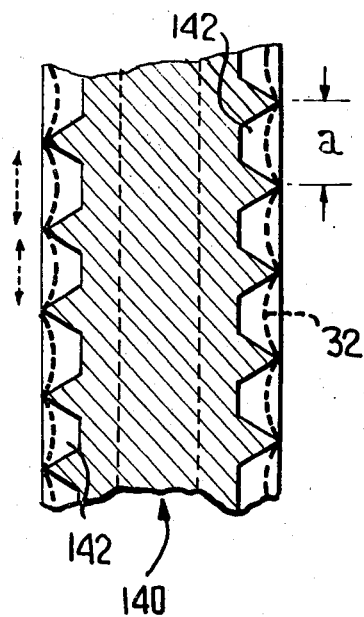
FIG. 11 is an enlarged fragmentary sectional view through a modified form of bath plate.

From FIG. 9 it is to be noted that when the grooves 70 are triangular in cross-section, in order to obtain the necessary volume of the flow passages 136, the walls of the groove are relatively shallow. As a result, when the membrane 32 bulges into the grooves 70, there is contact of the membrane with a portion of the groove walls restricting the useful transfer area of the membrane. In FIG. 11 there is illustrated a modified form of bath plate 140 which is of a construction similar to that of the bath plate 38 but wherein grooves 142 of a generally trapisoidal configuration are formed. It is to be noted that by making the grooves 142 of a trapisoidal shape, the side walls of the groove may be formed at a greater angle with the result that when a membrane is deformed into the groove 142, the contact of the membrane 32 with the walls of the groove is lessened, thus making available more surface of the membrane 32 for exchange purposes. It is particularly noted that the grooves 142 are illustrated in FIG. 11 as having the same width a so that an arcuate visual comparison can be made.

Reference is now made to FIGS. 12 and 13 wherein a modified form of blood plate, generally identified by the numeral 144, is illustrated. The blood plate 144 is of the same general construction as the blood plate 28 but differs therefrom in that the opposite surfaces thereof are not planar. Instead, shallow grooves 146 are formed in the opposite faces or surfaces of the blood plate 144 with these grooves 146 extending between the groove 44 and the slot 48 on one surface and the slot 48 and the groove 52 on the opposite surface. Further, the grooves 146 either slope or are arcuate to prevent nesting with the grooves 70, the arcuate form of the grooves 146 being illustrated.

Referring now to FIG. 13 in particular, it will be seen that each groove 146 is very shallow and is defined by a pair of generally triangular ribs 148 which are widely spaced as compared to their heighth. Thus, each groove 146 is a very shallow groove and provides for the formation of a very shallow flow passage 150 when there is associated with the blood plate 144 a membrane 152. The flow passages 150 provide for laminar flow of the blood. It is to be understood that because the blood flow passages 150 are preformed, the membrane 152 need not and should not deform into the grooves of the bath plates, the bath plates 140 being illustrated in FIG. 13, but the bath plates 30 being useable in a like manner. The membrane 152 may be formed of suitable plastics material such as polycarbonates.

At this time it is also pointed out that when the membranes are individual sheets as opposed to being a continuous pleated membrane, it may be necessary for the blood and bath plates to be provided with a longitudinal rib adjacent the slot through the plate so as to effect the required seal without the use of a sealant.

Although only several preferred embodiments of the dialyzer or kidney have been specifically illustrated and described herein, it is to be understood that various minor modifications may be effected within the scope of the appended claims.

I claim:

1. A dialyzer comprising a stack of first and second plates arranged in alternating relation, a membrane between adjacent plates, cooperating surfaces on said plates together with each membrane defining flow paths for different fluids on opposite sides of each membrane, and sealing means carried by said plates forming seals with said membranes, said seals being in the form of said plates being formed of a deformable soft plastic material and said plates having ribs thereon forcing said membranes into said plates, each plate being of a generally rectangular outline, said flow paths being generally transverse of said plates, and said ribs being disposed only transverse of said plates adjacent opposite ends thereof and spaced from said flow path.

2. The dialyzer of claim 1 wherein said membranes are in the form of a continuous pleated sheet extending transversely of said plates.

3. The dialyzer of claim 1 wherein substantially all of said plates have an inlet passage and an outlet passage on opposite surfaces thereof adjacent opposite ends thereof, said inlet and outlet passages opening through one edge of each said plate and being between said ribs.

4. A dialyzer comprising a stack of first and second plates arranged in alternating relation, a membrane between adjacent plates, cooperating surfaces on said plates together with each membrane defining flow paths for different fluids on opposite sides of each membrane, and sealing means carried by said plates forming seals with said membranes, said sealing being in the form of said plates being formed of a deformable material and said plates having ribs thereon forcing said membranes into said plates, each plate being of a generally rectangular outline, said flow paths being generally transverse of said plates, and said ribs being transverse of said plates adjacent opposite ends thereof and spaced from said flow path, said membranes being formed of oriented plastics material having the characteristic of resisting stretching transversely of said plates and being stretchable longitudinally of said plates.

5. A dialyzer comprising a stack of first and second plates arranged in alternating relation, a membrane between adjacent plates, cooperating surfaces on said plates together with each membrane defining flow paths for different fluids on opposite sides of each membrane, said plates including endmost plates, and all of said plates with the exception of said endmost plates having an inlet passage and an outlet passage on opposite surfaces thereof adjacent opposite ends thereof, said inlet and outlet passages opening through one edge of each said plate, all intermediate ones of said plates except said end plates having a through slot adjacent the edge thereof remote from said one edge, and said flow paths providing fluid flow first on one surface of each intermediate plate and then on the opposite surface thereof.

6. The dialyzer of claim 5 wherein each intermediate plate has formed in the opposite surfaces thereof adjacent said one edge flow control recesses cooperating with said slot.

7. The dialyzer of claim 6 wherein said first plates are planar between said grooves and slot thereof and said second plates having grooves and ribs extending between said flow control recesses and slot thereof and defining said flow paths on opposite surfaces of said second plates, and said membranes being deformable in between said ribs of said second plates to define said flow paths on opposite surfaces of said first plates.

8. The dialyzer of claim 7 wherein said ribs are narrow as compared to said grooves.

9. The dialyzer of claim 7 wherein said membranes are formed of oriented plastics material having the characteristic of resisting stretching transversely of said plates and being stretchable longitudinally of said plates.

10. The dialyzer of claim 6 wherein said membranes are generally rigid, and said flow paths are defined by ribs and grooves formed in the surfaces of each of said plates between said flow control recesses and slot thereof, the grooves and ribs of said first plates being shallow as compared to the grooves and ribs of said second plates and providing for laminar flow on the surfaces thereof.

11. A dialyzer comprising a stack of flow plates and membranes disposed in alternating relation, clamp plates at opposite ends of said stack parallel to said flow plates, and side plates surrounding said stack normal to said flow plates, said side plates being in interlocking relation with each other, at least certain of said side plates having a fluid fitting in an end thereof and a flow passage communicating a respective fluid fitting with said stack for effecting fluid flow through said stack, each fluid fitting is of the plug in type and includes a tube portion formed at one end as a plug, and there being a mounting plate carrying said tube portion and a releaseable fastener securing said mounting plate to a respective one of said side plates.

* * * * *